United States Patent
Ikebe et al.

(10) Patent No.: US 6,370,108 B1
(45) Date of Patent: Apr. 9, 2002

(54) DISC CARTRIDGE

(75) Inventors: Masaru Ikebe; Masatoshi Okamura, both of Nagano (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 09/220,182

(22) Filed: Dec. 23, 1998

(30) Foreign Application Priority Data

Dec. 24, 1997 (JP) ............................................. 9-366031

(51) Int. Cl.[7] .............................................. G11B 23/00
(52) U.S. Cl. ...................................... 369/291; 360/133
(58) Field of Search ........................ 360/60, 132, 133; 369/77.1, 77.2, 275.1, 263, 280, 281, 290, 291; 206/308.1, 308.2, 308.3

(56) References Cited

U.S. PATENT DOCUMENTS

| | | | | |
|---|---|---|---|---|
| 4,536,812 A | * | 8/1985 | Oishi et al. ................. | 360/133 |
| 4,796,138 A | * | 1/1989 | Ono ........................... | 360/133 |
| 5,121,279 A | * | 6/1992 | Saeki et al. ................. | 360/133 |
| 5,526,342 A | * | 6/1996 | Akiyama et al ............ | 369/291 |
| 5,699,217 A | * | 12/1997 | Lou ........................... | 360/132 |
| 5,805,566 A | * | 9/1998 | Kobayashi ................. | 369/291 |
| 5,835,318 A | * | 11/1998 | Kikuchi ..................... | 360/133 |
| 5,917,803 A | * | 6/1999 | Goto et al. ................. | 369/291 |
| 5,970,045 A | * | 10/1999 | Aoki et al. ................. | 369/291 |
| 5,991,261 A | * | 11/1999 | Maeda et al. .............. | 369/291 |
| 6,094,326 A | * | 7/2000 | Ikebe et al. ................ | 360/133 |
| 6,108,298 A | * | 8/2000 | Miyazaki et al. .......... | 369/291 |
| 6,205,115 B1 | * | 3/2001 | Ikebe et al. ................ | 369/291 |
| 6,215,011 B1 | * | 4/2001 | Ikebe et al. ................ | 360/133 |

FOREIGN PATENT DOCUMENTS

| | | | |
|---|---|---|---|
| EP | 0332214 A | | 9/1989 |
| EP | 0368347 A | | 5/1990 |
| EP | 0768664 A | | 4/1997 |
| EP | 0768665 A | | 4/1997 |
| EP | 0794532 A | | 9/1997 |
| EP | 0843310 A | | 5/1998 |
| EP | 0902428 A | | 3/1999 |
| GB | 2272990 A | * | 6/1994 |
| JP | 63-87677 | | 4/1988 |
| JP | 63-266669 | | 11/1988 |

* cited by examiner

*Primary Examiner*—Hoa T. Nguyen
*Assistant Examiner*—Chen Tianjie
(74) *Attorney, Agent, or Firm*—Lerner, David, Littenberg, Krumholz & Mentlik, LLP

(57) ABSTRACT

A disc cartridge capable of enhancing operability of both a cover and an erasure preventing plug while ensuring smooth removal of a disc shaped medium therefrom. An upper casing member and a lower casing member are formed with cutouts, respectively, and the cover is provided with projections fitted in the cutouts of the upper casing member and lower casing member, respectively. The cutouts of the upper casing member and lower casing member and the projections of the cover cooperate with each other to provide an operation hole for the erasure preventing plug and a detection hole therefor, respectively.

12 Claims, 7 Drawing Sheets

DISC CARTRIDGE

BACKGROUND OF THE INVENTION

This invention relates to a disc cartridge, and more particularly to a disc cartridge which permits a recordable/reproducible disc shaped medium such as an optical disc, a magneto-optical disc or the like removably received therein.

A disc shaped medium such as an optical disc, a magneto-optical disc or the like is generally classified into three types. One type or a first type is a disc shaped medium mounted in a recording/reproducing apparatus while being uncovered. Another type or a second type is a disc shaped medium mounted in a recording/reproducing apparatus while being unremovably received in a casing. The other or a third type is a disc shaped medium removably received in a casing. The third type disc shaped medium is mounted in a recording/reproducing apparatus while being either received in the casing or removed from the casing, resulting in being uncovered.

The first type disc shaped medium is represented by, for example, a compact disc (CD) and the second type disc shaped medium is represented by, for example, a mini-disc (MD).

The third type disc shaped media include, for example, a CD-ROM received in a CD caddie and the like. Removable arrangement of a CD-ROM in a CD caddie permits the CD-ROM to accommodate to both a reproducing apparatus of the type that the CD-ROM is mounted therein while being removed from the CD caddie and a reproducing apparatus of the type that the CD-ROM is mounted therein while being received in the CD caddie.

Also, there has been recently known a DVD which is an optical disc medium of the mass storage type. The DVDs proposed include a DVD-ROM, as well as a DVD-RAM. Further, it is proposed to construct a DVD-RAM so that it is not only operated in a recording/reproducing apparatus while being received in a cartridge, but removed from a cartridge so as to accommodate to a reproducing apparatus for a DVD-ROM in which a DVD is mounted therein while being uncovered.

A variety of structures are proposed for a disc cartridge for a DVD-RAM or the like. For example, there is known a structure which is so constructed that a cover is detachably or rotatably arranged on a side of cartridge opposite to a side of the cartridge on which a shutter is disposed, resulting in the cover being opened and closed for removal of a disc shaped medium from a casing. Such a structure is disclosed in Japanese Patent Application Laid-Open Publication No. 87677/1988 or the like.

Also, a structure for removing a disc shaped medium from a disc cartridge is disclosed in, for example, Japanese Patent Application Laid-Open Publication No. 266669/1988, which is so constructed that a cover is pivotally mounted on an upper surface section of a disc cartridge. However, the structure fails to permit a shutter for exposing the disc shaped medium during recording and reproducing operation to be arranged on the cover. Thus, the structure fails to be applied to a disc cartridge of the type that an opening for inserting a recording/reproducing head and a drive shaft therethrough into the disc cartridge are provided on each of both upper and lower sides of the disc cartridge.

When the conventional disc cartridge described above in which the DVD-RAM or the like is received is constructed to have a cover-detachable structure, there possibly occurs loss of the cover when the cover is separated from a casing of the disc cartridge for removal or takeout of the disc shaped medium from the cartridge.

Whereas, when the disc cartridge is constructed so as to rotatably mount the cover on the casing of the disc cartridge, it is required to form a pivot shaft of the cover and a bearing therefor to have a small size, to thereby form an opening to have a size greater than an outer diameter of the disc shaped medium such as the DVD-RAM or the like. Unfortunately, this causes the disc cartridge to be readily broken due to application of shock thereto or the like, to thereby be deteriorated in endurance and reliability.

Also, when the disc cartridge is applied to a recordable/reproducible disc shaped medium such as a DVD-RAM or the like, it is required to provide the disc cartridge with an erasure preventing mechanism.

When it is desired to provide the above-described rotation-type cover with such an erasure preventing mechanism, it is required that an operation projection of an erasure preventing member and a detection projection thereof be arranged so as not to interfere with a casing of the disc cartridge. Also, in this instance, the rotation-type cover is required to be operated by a slide mechanism moved so as to describe a locus of circular motion. Such arrangement of the rotation-type cover causes movement of the cover to be highly complicated, resulting in operability of the cover being deteriorated. Further, It causes the erasure preventing mechanism to be subject to structural restriction, resulting in being deteriorated in operability.

SUMMARY OF THE INVENTION

The present invention has been made in view of the foregoing disadvantages.

Accordingly, it is an object of the present invention to provide a disc cartridge which is capable of enhancing durability, reliability and operability of a cover while ensuring smooth removal of a disc shaped medium from the disc cartridge.

It is another object of the present invention to provide a disc cartridge which is capable of enhancing operability of an erasure preventing mechanism.

In accordance with the present invention, a disc cartridge is provided. The disc cartridge includes a casing constituted of an upper casing member and a lower casing member joined to each other and a cover arranged between the upper casing member and the lower casing member in a manner to be drawable out of the casing and rotatably mounted thereon with a recordable/reproducible disc shaped medium. The upper casing member and lower casing member are each formed with an opening through which a recording/reproducing head and a drive shaft of a recording/reproducing apparatus are inserted into the casing. The disc cartridge also includes a shutter formed to have a U-shape in section and slidably arranged on the casing so as to selectively open and close the openings of the upper casing member and lower casing member. The disc cartridge further includes an erasure preventing plug arranged in the cover. The upper casing member and lower casing member are formed with first and second cutouts, respectively, and the cover is provided with first and second projections fitted in the first and second cutouts of the upper casing member and lower casing member, respectively. The first and second cutouts of the upper casing member and lower casing member and the first and second projections of the cover cooperate with each other to provide an operation hole for the erasure preventing plug and a detection hole therefor, respectively.

In a preferred embodiment of the present invention, the erasure preventing plug includes an operation projection fitted in the operation hole and a detection projection fitted in the detection hole.

In a preferred embodiment of the present invention, the cover includes a front wall arranged on a side of the casing opposite to a side of the casing on which the shutter is arranged and is formed with a recess for receiving the erasure preventing plug. The recess of the cover is provided on an inner surface of the front wall with the first projection in a manner to be adjacent to one end of the erasure preventing plug when the erasure preventing plug is located at a recordable position which permits recording of information on the disc shaped medium.

In a preferred embodiment of the present invention, the recess of the cover is provided with a hole formed in a bottom wall thereof so as to be open to the detection hole. The second projection of the cover is arranged on the bottom wall in a manner to downwardly protrude from a part of a rim of the hole and to be contiguous to the front wall of the cover.

In a preferred embodiment of the present invention, the operation projection of the erasure preventing plug and the first projection of the cover are so formed that upper end surfaces thereof are flush with an upper surface of the upper casing member.

In a preferred embodiment of the present invention, the detection projection and the second projection of the cover are so formed that lower end surfaces thereof are flush with a lower surface of the lower casing member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a disc cartridge according to the present invention will be described with reference to the accompanying drawings.

Figure 1:
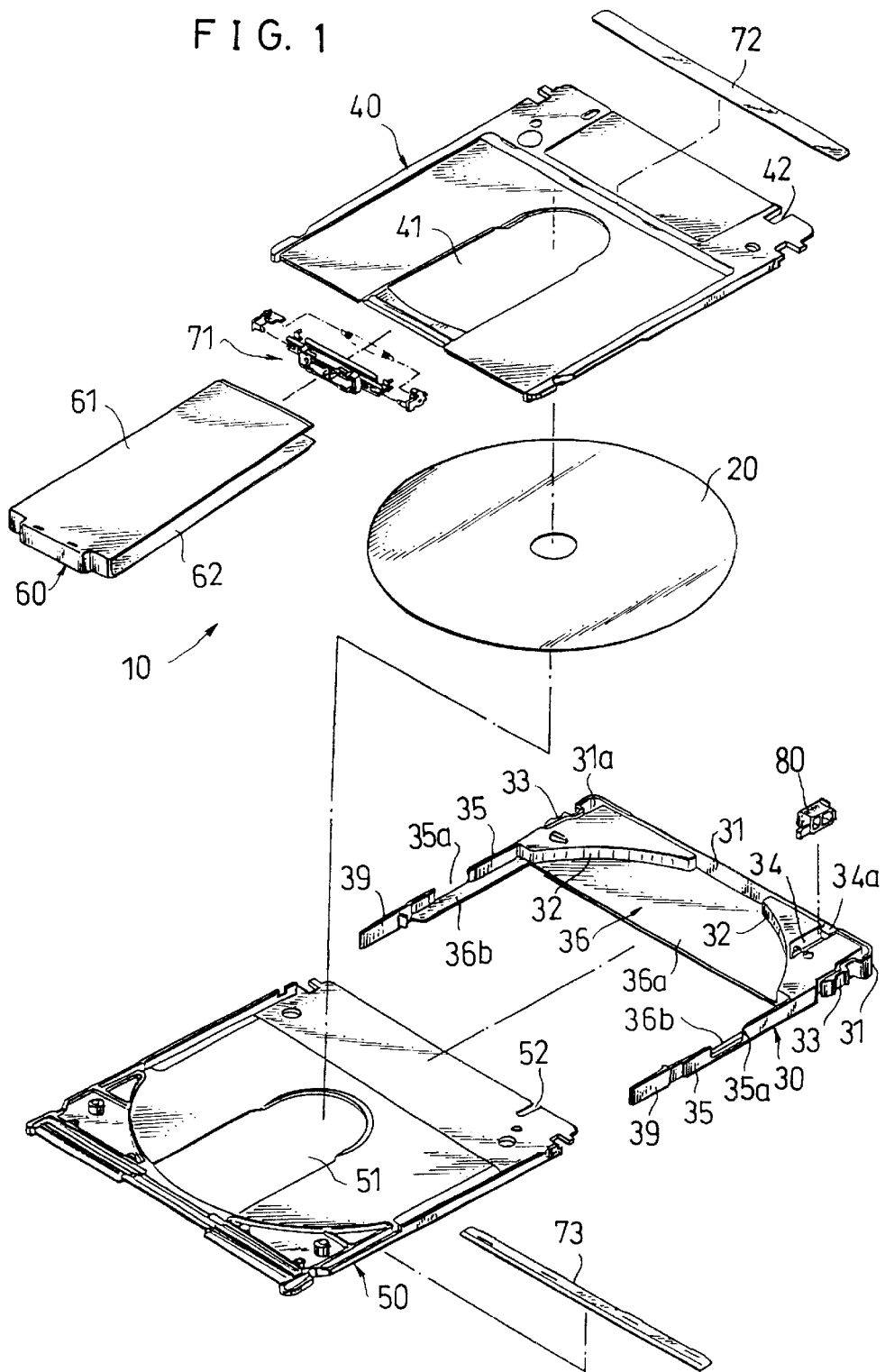
FIG. 1 is an exploded perspective view showing an embodiment of a disc cartridge according to the present invention.
Figure 2A:
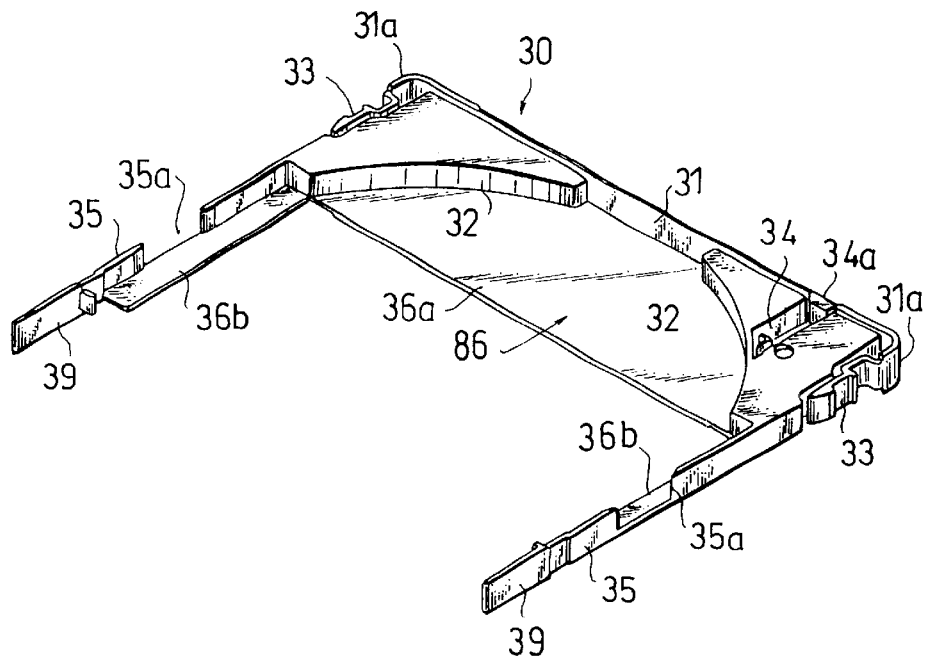
FIG. 2A is a perspective view showing a cover, of which a front surface faces up.
Figure 2B:
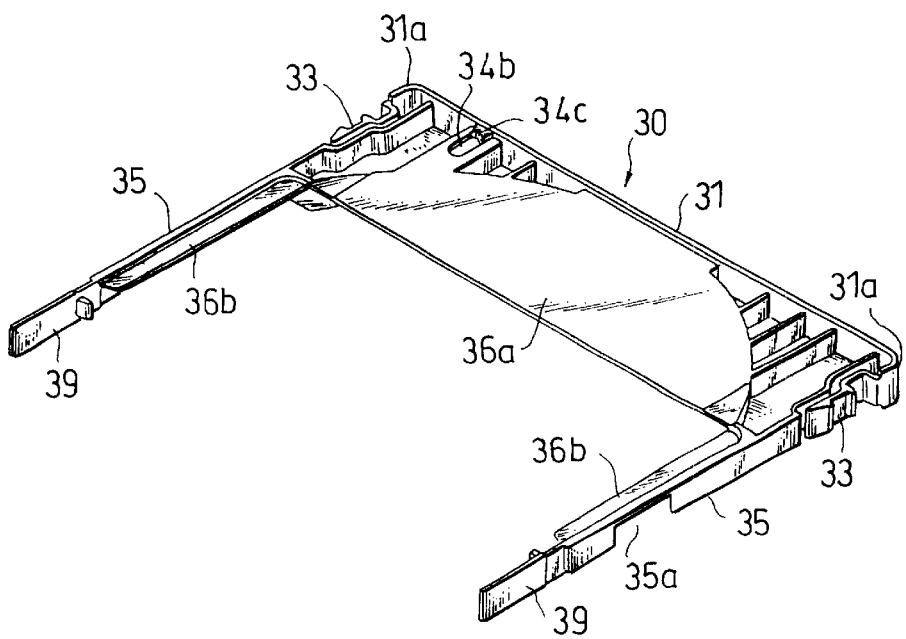
FIG. 2B is a perspective view of the cover shown in FIG. 2A, of which a rear surface faces up.
Figure 3A:
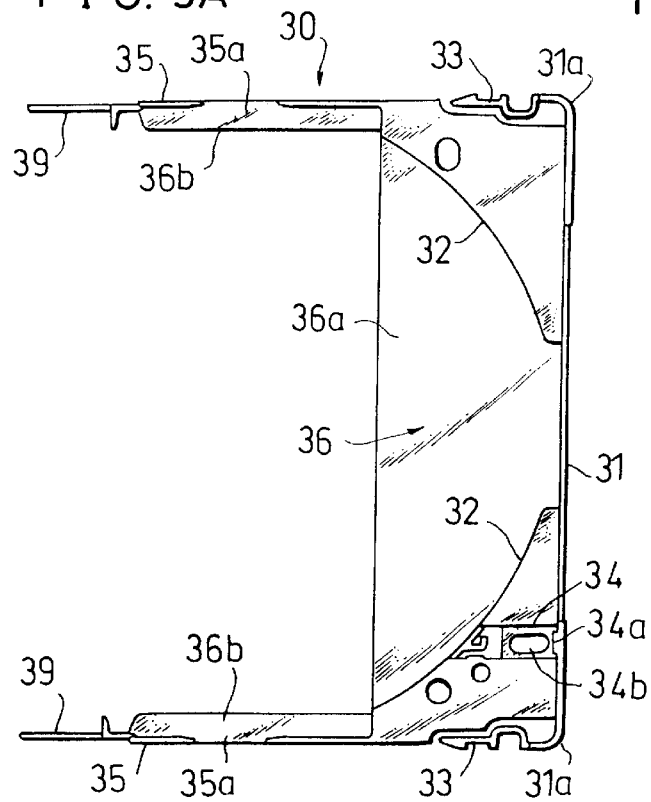
FIG. 3A is a plan view showing the cover shown in FIG. 2A.
Figure 3B:
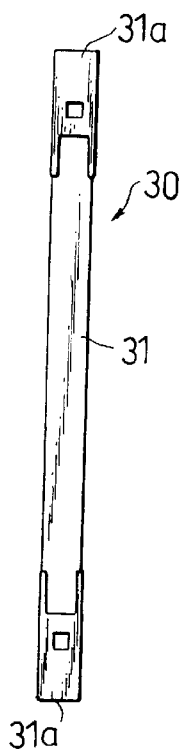
FIG. 3B is a side elevation view of the cover shown in FIG. 2A.
Figure 3C:
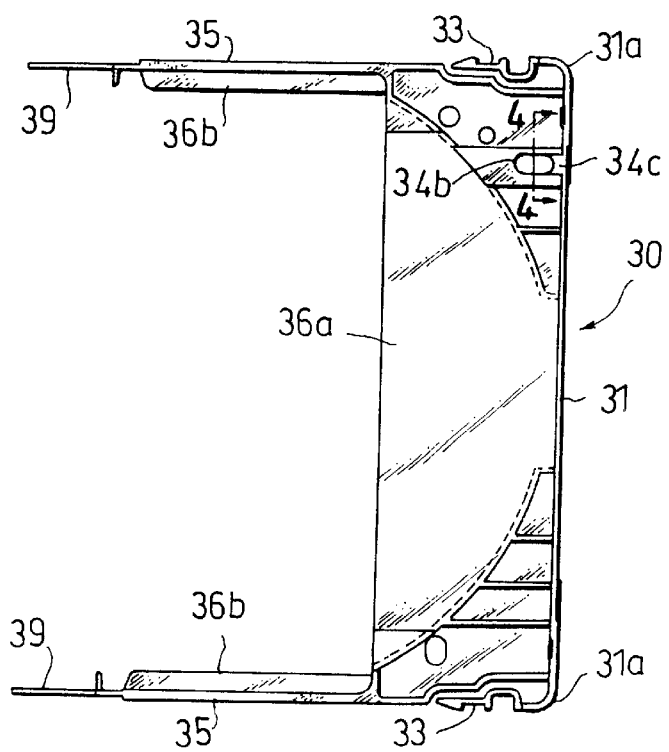
FIG. 3C is a bottom view of the cover shown in FIG. 2A.

Referring now to FIG. 1, an embodiment of a disc cartridge according to the present invention is illustrated. A disc cartridge of the illustrated embodiment is adapted to receive therein a disc shaped medium 20 in the form of an optical disc and more specifically a DVD-RAM by way of example. The optical disc may be constructed to be of a one-sided recording/reproducing type.

In the illustrated embodiment, the disc cartridge generally designated at reference numeral 10 includes a casing formed by joining an upper casing member 40 and a lower casing member 50 to each other, with a cover 30 being interposedly arranged therebetween in a manner to be drawable out of the casing. The cover 30 is mounted thereon with the recordable/reproducible disc shaped medium 20 in a manner to be rotatable.

The upper casing member 40 and lower casing member 50 are formed with openings 41 and 51, respectively, each of which permits a recording/reproducing head of a recording/reproducing apparatus and a drive shaft thereof to be inserted into the casing therethrough. The openings 41 and 51 each include a semicircular opening section for insertion of the drive shaft and a substantially rectangular opening section for insertion of the reproducing/reproducing head.

The disc cartridge 10 of the illustrated embodiment also includes a shutter 60 of a U-shape in section, which is arranged so as to straddle the upper casing member 40 and lower casing member 50 and be slidable on the casing in both lateral directions thereof. The shutter 60 includes an upper plate 61 and a lower plate 62, which are arranged on the upper casing member 40 and lower casing member 50 in a manner to be slidable thereon, respectively. Thus, the upper plate 61 and lower plate 62 are slidably moved on the upper casing member 40 and lower casing member 50 to selectively open and close the openings 41 and 51, respectively.

The shutter 60 is securely mounted on a slider 71. The slider 71 is formed with a hook-like ruggedness and correspondingly the casing is formed on an inner surface thereof with a groove, so that the ruggedness and groove cooperate with each other to slidably guide the shutter 60 between an open position and a closed position.

Reference numerals 72 and 73 designate guides fixed to the upper casing member 40 and lower casing member 50 by a suitable means such as welding, adhesion or the like, resulting in guiding distal ends of the upper plate 61 and lower plate 62 of the shutter 60, respectively.

The cover 30 is arranged in a manner to be drawable out of the casing on a side of the casing opposite to a side thereof on which the shutter 60 is mounted, so that drawing or removal of the cover 30 permits the disc shaped medium 20 supported thereon to be removed from the casing.

Reference numeral 80 designates an erasure preventing plug mounted in the cover 30, which functions to selectively set the disc shaped medium 20 in a "recordable" state which permits recording of data or information on the medium 20 or a "unrecordable" state which does not permit the recording.

Now, the cover 30 will be described more detailedly with reference to FIGS. 2A to 5.

The cover 30 is preferably made of either polyacetal (POM) resin or polyolefin resin increased in slidability such as polypropylene (PP) or the like.

The upper casing member 40 and lower casing member 50 may be generally made of acrylonitrile-butadiene-styrene (ABS) resin. When the upper casing member 40 and lower casing member 50 are joined together by ultrasonic welding, the casing members 40 and 50 and the cover 30 are preferably made of resin materials different from each other, respectively. When each casing member 40 or 50 and the cover 30 are made of the same material, the casing members and the cover may be possibly fixed to each other due to vibration during ultrasonic welding.

The cover 30, as shown in FIGS. 2A to 3C, includes a front wall 31 which acts as a drawer of the cover 30. The front wall 31 is arranged on a side of the casing opposite to a side thereof on which the shutter 60 is arranged. The cover 30 also includes a position regulating wall 32 formed to have an arcuate shape and arranged inside the front wall 31 so as to regulate movement of the disc shaped medium 20 when the disc shaped medium 20 is mounted on the cover 30.

The cover 30 is also provided on opposite sides thereof with a pair of engagements 33 each including a pawl provided at a distal end thereof and an elastically flexible arm. The engagements 33 of the cover 30 are engaged with the upper casing member 40 and lower casing member 50 to lock the cover 30 with respect to the casing when the cover 30 is slidably received within the casing. This, when the engagements 33 are inwardly forcedly deflected, permits the engagements 33 to be disengaged from the upper casing member 40 and lower casing member 50; so that outward pulling of lugs 31a provided on opposite sides of the front wall 31 of the cover 30 permits the cover 30 to be drawn out of the casing.

The cover 30 is provided with a receiving recess 34 in which the erasure preventing plug 80 is received in a manner to be selectively held at a recordable position or an unrecordable position while being movable between the recordable position and the unrecordable position.

Figure 4:
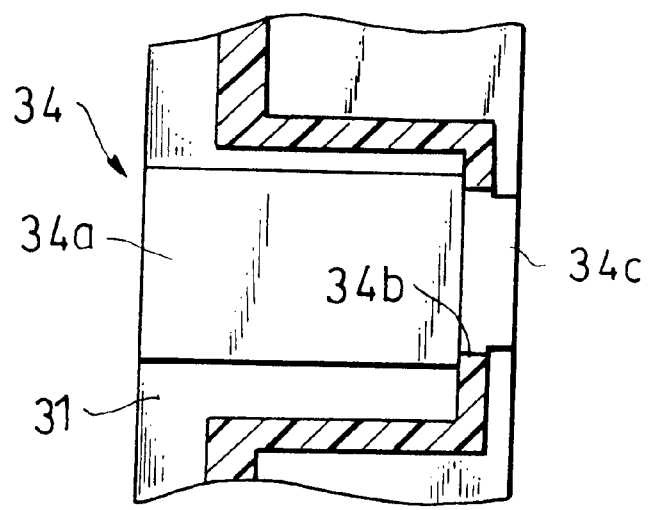
FIG. 4 is a sectional view taken along line 4—4 of FIG. 3C.
Figure 5:
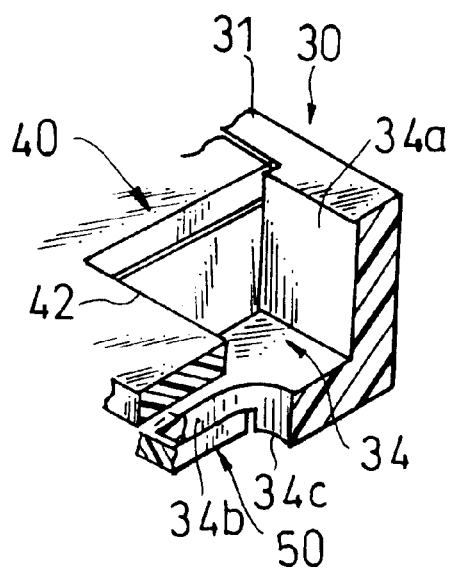
FIG. 5 is a fragmentary perspective view showing an essential part of fitting between a receiving section of the cover and an upper casing member.
Figure 7:
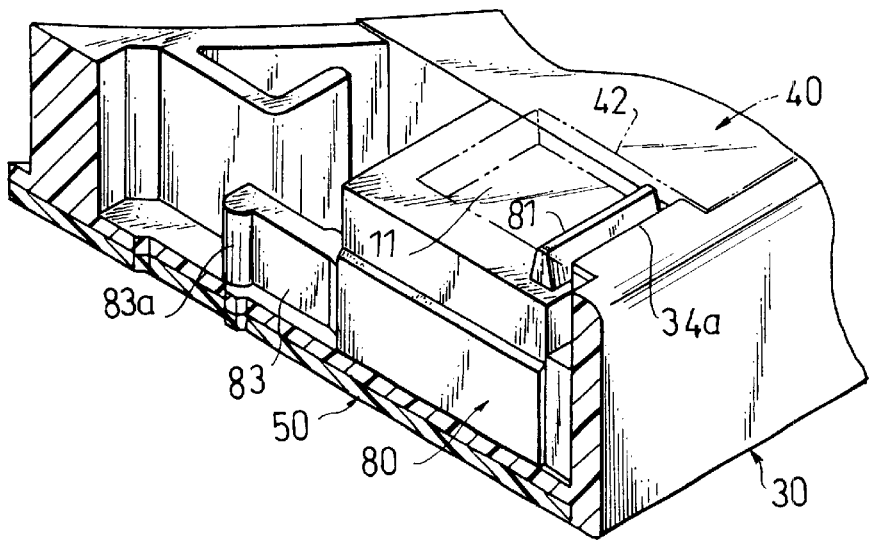
FIG. 7 is a fragmentary perspective view showing an essential part of an upper section of the disc cartridge wherein the erasure preventing plug is mounted on the cover.
Figure 8:
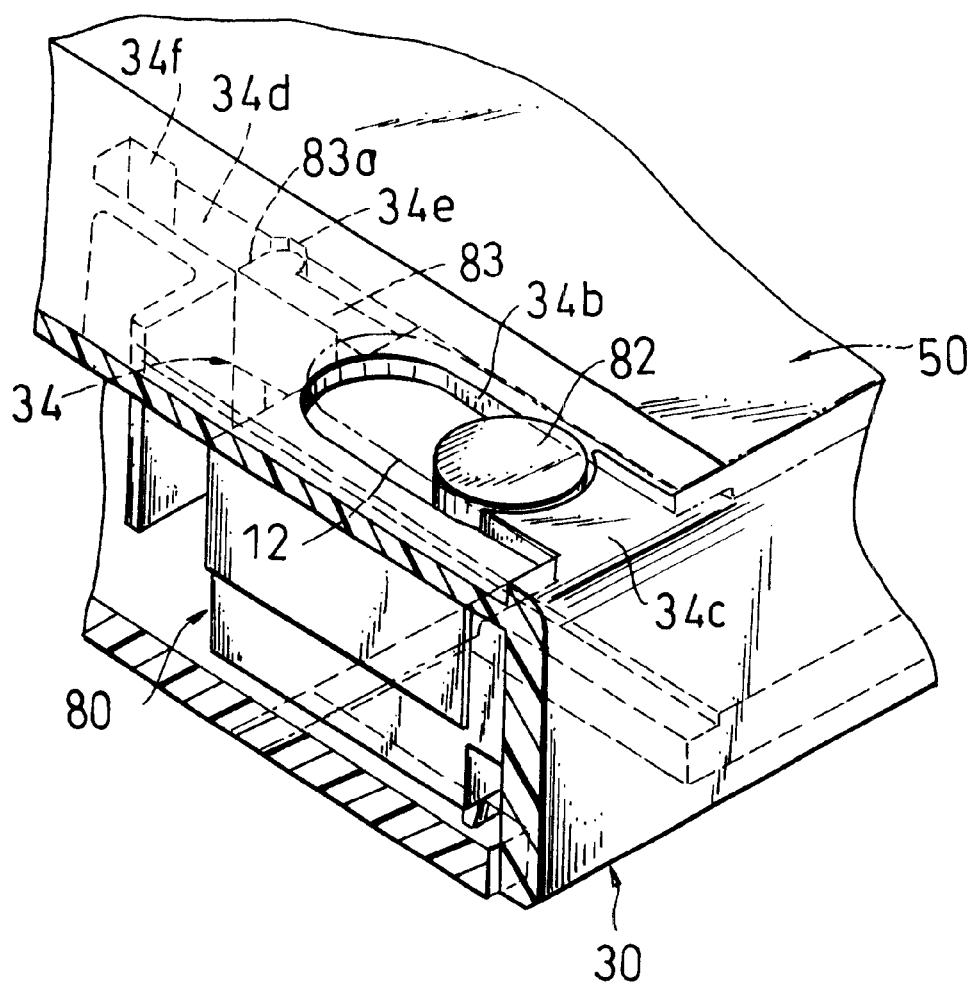
FIG. 8 is a fragmentary perspective view showing an essential part of a lower section of the disc cartridge wherein the erasure preventing plug is mounted on the cover.

The receiving recess 34 is provided on an inner surface of the front wall 31 of the cover 30 with a first projection 34a as shown in FIGS. 4, 5 and 7. Also, the receiving recess 34 is formed in a bottom wall thereof with a substantially elliptic hole 34b. Further, the receiving recess 34 is provided on the bottom wall thereof with a second projection 34c in a manner to be contiguous to the front wall 31 of the cover 30, as shown in FIGS. 4 and 8. The second projection 34c may be formed by downwardly protruding a part of a rim of the hole 34b in a U-shape from a bottom surface of the bottom wall of the cover 30.

The cover 30 also includes a pair of side walls 35, which are arranged in a manner to extend from the opposite ends of the front wall 31 in a direction perpendicular thereto and be parallel to each other and so as to be slid on inner side surfaces of the upper casing member 40 and lower casing member 50. The side walls 35 are each formed with a cutout 35a, which functions to keep the side wall from interfering with the outer periphery of the disc shaped medium 20 when the disc shaped medium 20 is mounted on the cover 30 and provide a space for arrangement of the disc shaped medium 20.

The cover 30 is further formed thereon with a medium mounting section 36 for mounting the disc shaped medium 20 thereon. The medium mounting section 36 is constituted of a plate portion 36a of a semicircular shape or a segment shape in plan and a pair of strip-like plate portions 36b arranged inside the side walls 35. Such arrangement of the medium mounting section 36 permits the disc shaped medium 20 mounted on the cover 30 to be stably supported on three such plate portions 36a and 36b, to thereby prevent from being dislocated from the cover 30 during inserting and taking out of the disc shaped medium 20 with respect to the casing.

The side walls 35 are each provided at a distal end thereof with a guided section 39, which is guided by each of guide grooves (not shown) provided on the upper casing member 40 and lower casing member 50, to thereby slide the cover 30 in the casing. This permits the disc shaped medium 20 to be drawn out of the casing of the disc cartridge 10 by a distance somewhat larger than a radius of the disc shaped medium 20, so that the disc shaped medium 20 may be taken out of the cover 30 while inserting a finger into a central hole of the disc shaped medium 20 after the cover 30 is drawn out of the casing.

Figure 6A:
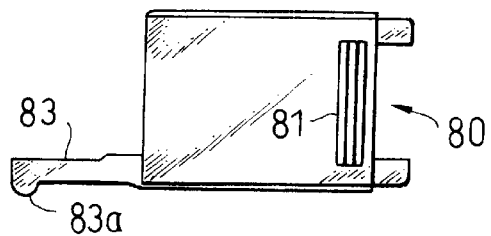
FIG. 6A is a plan view showing an erasure preventing plug.
Figure 6B:
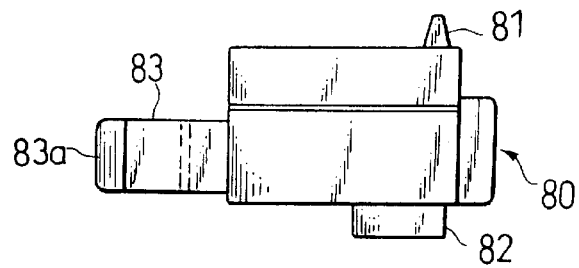
FIG. 6B is a side elevation view of the erasure preventing plug shown in FIG. 6A.
Figure 6C:
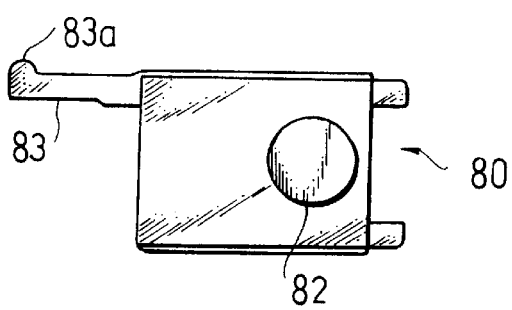
FIG. 6C is a bottom view of the erasure preventing plug shown in FIG. 6A.

Now, the erasure preventing plug 80 will be described more detailedly with reference to FIGS. 6A to 6C. The erasure preventing plug 80 includes a plug body of a substantially rectangular parallelopiped shape, which is provided on an upper surface thereof with an operation projection 81 of a substantially prism-like shape. The operation projection 81 is adapted to be pushed when the erasure preventing plug 80 is to be moved. The erasure preventing plug 80 also includes a detection projection 82 formed to have a substantially cylindrical shape and arranged so as to downwardly extend from a bottom of the plug body. The erasure preventing plug 80 further includes an arm 83 provided on one side of the plug body so as to outwardly horizontally extend therefrom and be elastically flexible. The arm 83 is formed at a distal end thereof with projection 83a of a substantially semi-cylindrical shape.

Now, the manner of arrangement of the erasure preventing plug in the cover 30 will be described with reference to FIGS. 7 and 8. The receiving recess 34 of the cover 30, as shown in FIG. 8, is formed therein with a groove portion 34d for guiding the arm 83 of the erasure preventing plug 80. Also it is formed with recess portions 34e and 34f with which the projection 83a of the arm 83 is engaged. Thus, when the erasure preventing plug 80 is disposed in a portion of the receiving recess 34 adjacent to the front wall 31, it is located at a recordable position which permits recording of information on the disc shaped medium 20, so that the projection 83a of the arm 83 may be engaged with the recess portion 34e of the receiving recess 34, to thereby hold the erasure preventing plug 80 at the recordable position. Then, when the operation projection 81 is pushed to move the erasure preventing plug 80 in a direction away from the front wall 31, the arm 83 is moved in the groove portion 34d, so that the erasure preventing plug 80 is stopped at a position at which the projection 83a of the arm 83 is engaged with the recess portion 34f. The position defines an unrecordable position of the erasure preventing plug 80 which prevents recording of information on the disc shaped medium 20.

The erasure preventing plug 80 is received in the receiving recess 34 so that a play or clearance occurs between the plug 80 and the recess 34. This may possibly cause the erasure preventing plug 80 to be forwardly or rearwardly inclined, leading to a failure in smooth movement of the erasure preventing plug 80, when the operation projection 81 is pushed in order to move the erasure preventing plug 80 in a direction away from the front wall 31 of the cover 30. However, the present invention is so constructed that when the erasure preventing plug 80 is at the recordable position, it is substantially abutted against the first projection 34a of the receiving recess 34 and the detection projection 82 of the plug 80 is substantially abutted against the second projection 34c of the receiving recess 34. This substantially prevents the erasure preventing plug 80 from being inclined as described above, to thereby ensure smooth movement of the plug 80.

Figure 9A:
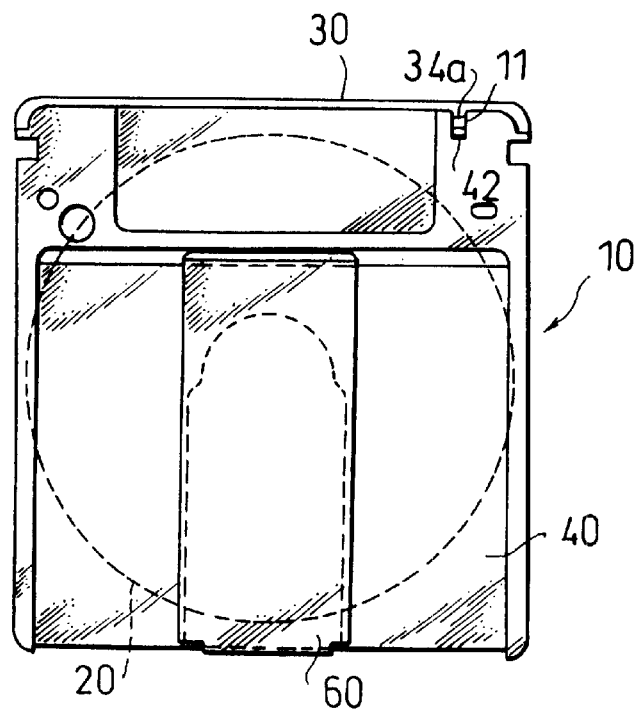
FIG. 9A is a plan view showing the disc cartridge.
Figure 9B:
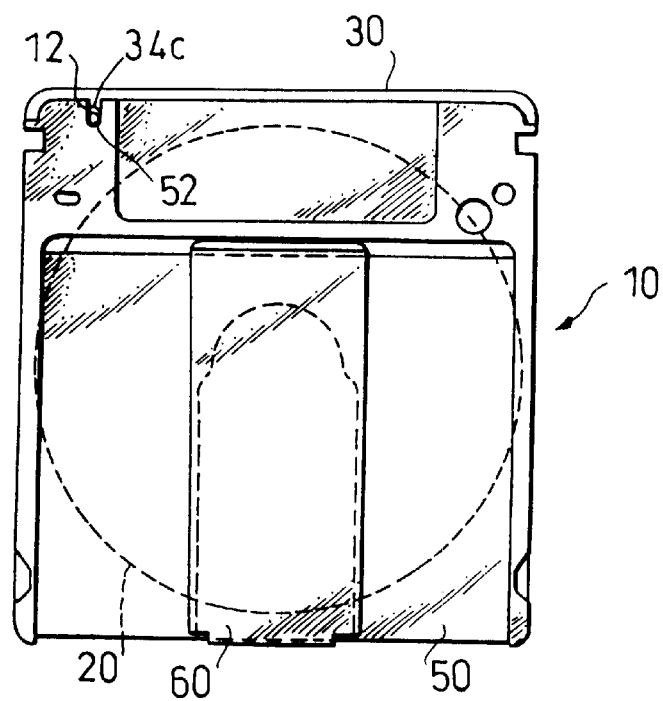
FIG. 9B is a bottom view of the disc cartridge.

The upper casing member 40 and lower casing member 50, as shown in FIGS. 1, 9A and 9B, are formed at portions thereof positionally corresponding to the receiving recess 34 of the cover 30 with a recess-like cutout 42 and a cutout 52 of a substantially U-shape, respectively. Such arrangement of the cutouts 42 and 52, when the cover 30 is received in the casing of the disc cartridge 10, permits the cutouts 42 and 52 to be positioned above and below the receiving recess 34, respectively.

The recess-like cutout 42 of the upper casing member 40 is fitted therein with the first projection 34a of the cover 30, so that the cutout 42 and first projection 34a may cooperate with each other to define an operation hole 11 of a substantially rectangular or square shape. The operation hole 11 thus defined permits the operation projection 81 of the erasure preventing plug 80 to be exposed through the operation hole 11.

Also, the cutout 52 of the lower casing member 50 is fitted therein with the second projection 34c of the cover 30, so that the cutout 52 and second projection 34c cooperate with each other to define a detection hole 12 of a substantially elliptic shape. The thus-defined detection hole 12 permits the detection projection 82 of the erasure preventing plug 80 to be exposed through the detection hole 12.

The operation projection 81 and detection projection 82 of the erasure preventing plug 80 are so formed that end surfaces or a top surface of the operation projection 81 and a bottom surface of the detection projection 82 are rendered flush with upper and lower surfaces of the casing of the disc cartridge 10, respectively.

Removal or takeout of the disc shaped medium 20 from the casing may be attained merely by drawing the cover 30 out of the casing as described above. At this time, the erasure preventing plug 80 is likewise drawn out of the casing while being mounted in the cover 30.

As described above, the disc cartridge of the illustrated embodiment is so constructed that the upper casing member 40, lower casing member 50 and cover 30 cooperate together to provide the operation hole 11 and detection hole 12 for the erasure preventing plug 80. Such construction effectively prevents formation of any gap between the operation hole 11 and the erasure preventing plug 80 when the erasure preventing plug is at the recordable position. Also, such construction permits the bottom surface of the detection projection 82 of the erasure preventing plug 80 to be flush with a bottom surface of the second projection 34c of the receiving recess 34, resulting in an appearance of the disc cartridge being improved. Suitable adjustment of a length of each of the first and second projections 34a and 34c permits the operation hole 11 and detection hole 12 to be formed at any desired position.

Also, such formation of the operation hole 11 and detection hole 12 as described above permits the erasure preventing plug 80 to be provided in a conventional manner. This permits the erasure preventing plug to be applied in common to a disc cartridge which is not provided with a cover and in which a recordable/reproducible disc shaped medium is unremovably received.

Further, the illustrated embodiment is so constructed that the first and second projections 34a and 34c of the receiving recess 34 are respectively fitted in the cutouts 42 and 52 of the upper casing member 40 and lower casing member 50. This prevents deviation of the cover 30 in a horizontal direction during closing of the cover 30, to thereby ensure both durability and reliability of the cover 30 even when the side walls 35 of the cover 30 fail to be formed to have a sufficient thickness.

The illustrated embodiment has been described in connection with the one-sided recordable/reproducible disc shaped medium 20. Alternatively, the present invention may be effectively applied to a both-sided recordable/reproducible disc shaped medium as well. In this instance, additional one such receiving recess 34, cutout 42 and cutout 52, erasure preventing plug 80 are provided in a symmetric manner with respect to the those described above, respectively.

As can be seen from the foregoing, in the disc cartridge of the present invention, the upper casing member, lower casing member and cover cooperate with each other to provide the operation hole and detection hole for the erasure preventing plug. This effectively prevents formation of a gap between the operation hole and the erasure preventing plug. Also, such construction permits the bottom surface of the detection projection of the erasure preventing plug to be flush with the bottom surface of the second projection of the receiving recess, resulting in an appearance of the disc cartridge being improved. Suitable adjustment of a length of each of the first and second projections of the receiving recess permits the operation hole and detection hole to be formed at any desired position.

Also, the disc cartridge of the present invention is so constructed that when the erasure preventing plug is at the recordable position, the erasure preventing plug and the detection projection of the plug are substantially abutted against the projections of the receiving recess, respectively. This substantially prevents the erasure preventing plug from being inclined at the beginning of movement as described above, to thereby ensure smooth movement of the plug.

Further, the present invention is so constructed that the first and second projections of the receiving recess are respectively fitted in the cutouts of the upper casing member and lower casing member. This prevents horizontal deviation of the cover during closing of the cover, to thereby ensure both durability and reliability of the cover.

Moreover, the operation hole and detection hole for the erasure preventing plug may each be arranged at any desired position, so that the erasure preventing plug may be applied in common to a disc cartridge which is not provided with a cover and in which a recordable/reproducible disc shaped medium is unremovably received.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:
   a casing constituted of an upper casing member and a lower casing member joined to each other, said upper casing member and lower casing member each being formed with an opening through which a recording/reproducing head and a drive shaft of a recording/reproducing apparatus are inserted into said casing;

a cover arranged between said upper casing member and said lower casing member in a manner to be drawable out of said casing and rotatably mounted thereon with a recordable/reproducible disc shaped medium;

a shutter formed to have a U-shape in section and slidably arranged on said casing so as to selectively open and close said openings of said upper casing member and lower casing member; and an erasure preventing plug arranged in said cover;

said upper casing member and lower casing member being formed with first and second cutouts, respectively;

said cover being provided with first and second projections fitted in said first and second cutouts of said upper casing member and lower casing member, respectively;

said first and second cutouts of said upper casing member and lower casing member and said first and second projections of said cover cooperating with each other to provide an operation hole for said erasure preventing plug and a detection hole therefor, respectively;

said first cutout and said second cutout being positioned so as to be in alignment when said upper casing member and said lower casing member are joined to each other so that an operation projection of said plug is movably fitted in said operation hole and a detection projection of said plug is movably fitted in said detection hole.

2. A disc cartridge as defined in claim 1, wherein said cover includes a front wall arranged on a side of said casing opposite to a side of said casing on which said shutter is arranged and is formed with a recess for receiving said erasure preventing plug; and said recess of said cover is provided on an inner surface of said front wall with said first projection in a manner to be adjacent to one end of said erasure preventing plug when said erasure preventing plug is located at a recordable position which permits recording of information on said disc shaped medium.

3. A disc cartridge as defined in claim 2, wherein said recess of said cover is provided with a hole formed in a bottom wall thereof so as to be open to said detection hole; and said second projection of said cover is arranged on said bottom wall in a manner to downwardly protrude from a part of a rim of said hole and to be contiguous to said front wall of said cover.

4. A disc cartridge as defined in claim 1, wherein said cover includes a front wall arranged on a side of said casing opposite to a side of said casing on which said shutter is arranged and is formed with a recess for receiving said erasure preventing plug; and said recess of said cover is provided on an inner surface of said front wall with said first projection in a manner to be adjacent to one end of said erasure preventing plug when said erasure preventing plug is located at a recordable position which permits recording of information on said disc shaped medium.

5. A disc cartridge as defined in claim 4, wherein said recess of said cover is provided with a hole formed in a bottom wall thereof so as to be open to said detection hole; and said second projection of said cover is arranged on said bottom wall in a manner to downwardly protrude from a part of a rim of said hole and to be contiguous to said front wall of said cover.

6. A disc cartridge as defined in claim 5, wherein said operation projection of said erasure preventing plug and said first projection of said cover are so formed that upper end surfaces thereof are flush with an upper surface of said upper casing member.

7. A disc cartridge as defined in claim 5, wherein said detection projection and said second projection of said cover are so formed that lower end surfaces thereof are flush with a lower surface of said lower casing member.

8. A disc cartridge as defined in claim 4, wherein said operation projection of said erasure preventing plug and said first projection of said cover are so formed that upper end surfaces thereof are flush with an upper surface of said upper casing member.

9. A disc cartridge as defined in claim 4, wherein said detection projection and said second projection of said cover are so formed that lower end surfaces thereof are flush with a lower surface of said lower casing member.

10. A disc cartridge as defined in claim 1, wherein said operation projection of said erasure preventing plug and said first projection of said cover are so formed that upper end surfaces thereof are flush with an upper surface of said upper casing member.

11. A disc cartridge as defined in claim 10, wherein said detection projection and said second projection of said cover are so formed that lower end surfaces thereof are flush with a lower surface of said lower casing member.

12. A disc cartridge as defined in claim 1, wherein said detection projection and said second projection of said cover are so formed that lower end surfaces thereof are flush with a lower surface of said lower casing member.

* * * * *